Figure 1:
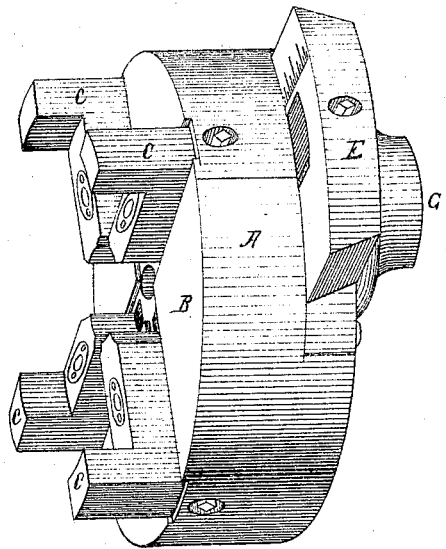

W. H. King.
Lathe Chuck.

No. 109,423. Patented Nov. 22, 1870.

Witnesses
Harry King
W. J. Peyton

Inventor
W. H. King
by Wiedersheim & Norris
Attys

United States Patent Office.

WILLIAM HASKELL KING, OF NEWARK, NEW JERSEY.

Letters Patent, No. 109,423, dated November 22, 1870.

IMPROVEMENT IN LATHE-CHUCKS.

The Schedule referred to in these Letters Patent and making part of the same.

*To all whom it may concern:*

Be it known that I, WILLIAM HASKELL KING, of Newark, in the county of Essex and State of New Jersey, have invented a new and useful Improvement in Lathe-Chucks, of which the following is a specification.

Nature of Invention.

My present invention is an improvement on my patent for lathe-chucks, granted April 25, 1865, and numbered 47,428, and consists of a certain new and improved arrangement of parts, all of which will be hereinafter more fully set forth.

In the drawing—

Figure 2:
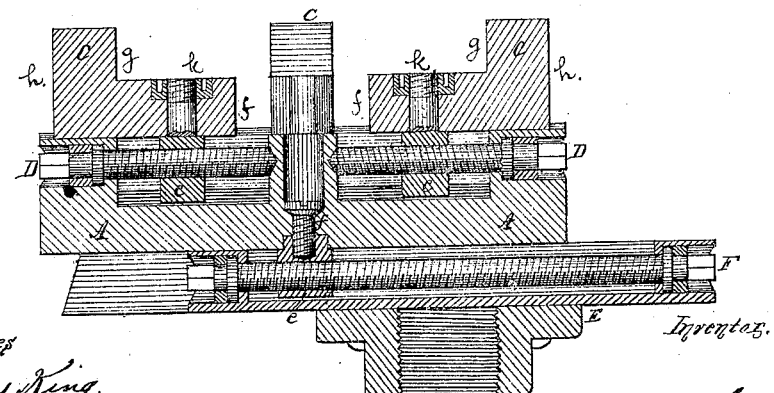

Figure 1 is a perspective view of my invention, showing clamping device and beveled graduated slide or plate, and Figure 2 is a central vertical longitudinal section of the same.

A is the shell;

B, a face secured thereto, and provided with grooves cut at right angles to each other.

In these grooves L or other-shaped dogs or jaws C C slide. These dogs are provided with nuts $c\ c$, which are secured therein by screw-caps or nuts, fitting on shanks or projections making part of the nuts. Underneath the dogs, and within the shell, a mortise or recess is formed sufficiently large to allow a free movement of the dogs therein.

The dogs C are retained firmly in place by means of the nuts $k$, but when they are to be turned, said nuts are loosened and the dogs are raised from their grooves in the face plate of the shell A. After turning, the dogs the nuts are tightened, and the former rest in their grooves and remain immovable on the shanks of the nuts $c$, but their radial movement is not interfered with.

Screws D, having squared heads fitting snugly in recesses formed in the shell A, serve to adjust the dogs C, by passing through the nuts $c\ c$ and engaging with their threaded interiors.

The dogs may be turned so as to present either of their faces $f\ g\ h$ toward the center. Thus articles of irregular form and varying thickness and width may be readily held. The shanks of the nuts $c\ c$ are the fulcrums of the dogs.

In putting together the chuck, the nuts $c$ are laid in the recesses, and the dogs fitted on the shanks of the nuts and rest in the grooves on the face of the chuck. The screws D are passed through the nuts, and thus the parts are held in place without the necessity of dovetail, T-headed, or other grooves.

A suitable key is used to operate these screws, and when it is desired to place an article in the chuck the dogs are simply moved inwardly or outwardly, to suit the size of the article, the screws and nuts holding the dogs firmly in place and preventing slipping.

The article may be arranged eccentrically or concentrically, as may be required, the dogs being so constructed and located as to slide over the center of the shell, and also beyond its circumference, thus allowing of these adjustments.

On the opposite face of the chuck a beveled groove is formed, to receive a graduated slide or plate, E.

This groove may be cut out directly from the shell, or one side may be beveled and the other left straight, and a beveled piece set therein, and secured by screws, &c. This form will be found the more advantageous, as it gives a tight joint and keeps the plate firm in its place.

The plate E is rendered adjustable by a screw, F, whose head or heads are secured in the plate at the ends of a mortise formed therein.

In this case the screw passes entirely through the plate. Instead, one end or head may be squared, and the other rounded off and fitted in a notch or recess formed in the other end, in which it may revolve as the plate is adjusted.

The plate E is provided with a threaded recess, G, by means of which it is secured to the lathe, and it is attached to the shell by means of a nut, $e$, through which the screw F passes, the said nut being held stationary by a screw, $f$, which is fixed in the chuck.

The nut being stationary, allows of the adjustment of the plate independently of the dogs and article held thereby, and the said adjustment should be equal to the quantity it is desired to cut off the article held by the dogs; and to render the cutting off of just the desired quantity certain, the plate is graduated as shown.

Having described my invention,

What I claim as new, and desire to secure by Letters Patent, is—

The combination, as herein described, of the chuck-shell A, screws D, threaded nut-bolts $c$, nuts $k$, and dogs C, for the purpose set forth.

To the above I have signed my name this 7th day of July, 1870.

WM. HASKELL KING.

Witnesses:
ABRAHAM MANNERS,
OLIVER DRAKE.